UNITED STATES PATENT OFFICE.

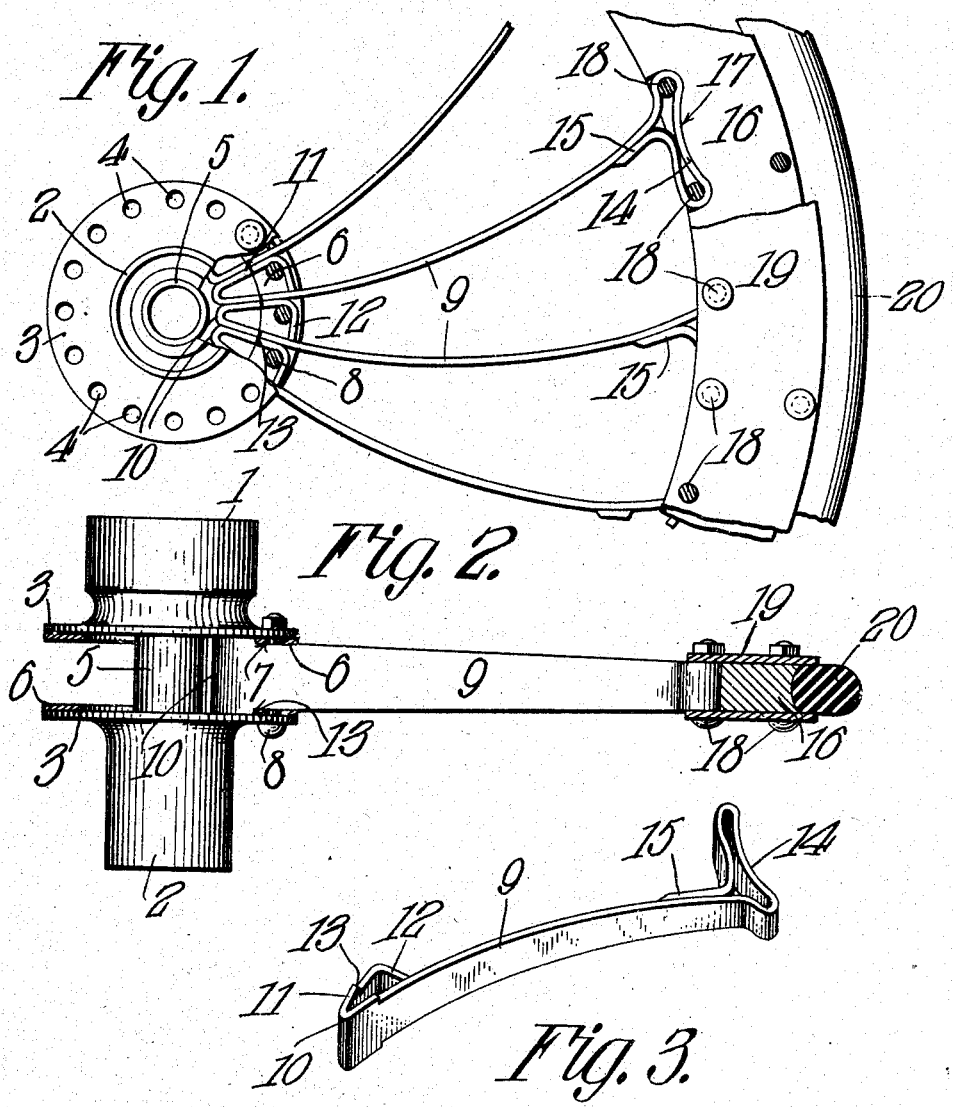

EVERETT S. STANCLIFT, OF BERKELEY, CALIFORNIA.

VEHICLE-WHEEL.

No. 927,891.     Specification of Letters Patent.     Patented July 13, 1909.

Application filed March 12, 1908. Serial No. 420,673.

*To all whom it may concern:*

Be it known that I, EVERETT S. STANCLIFT, a citizen of the United States, residing at Berkeley, in the county of Alameda and State of California, have invented a new and useful Vehicle-Wheel, of which the following is a specification.

This invention relates to vehicle wheels of that type utilizing spring spokes for producing the desired resiliency.

The object of the invention is to provide spokes of novel form and which are secured to the hub and felly of the wheel in a novel manner.

A further object is to provide spokes which are self-bracing whereby the same are reinforced adjacent their points of attachment where the greatest strain is received.

A further object is to provide spokes any one of which can be readily removed and a new one replaced in the event of wear or breakage.

A further object is to provide spokes which can be readily formed and which are durable and inexpensive.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in section and partly in elevation of a portion of a wheel embodying the present improvements. Fig. 2 is a transverse section through a portion of the wheel. Fig. 3 is a detail view of one of the spokes.

Referring to the figures by characters of reference, 1 and 2 constitute hub sections having annular flanges 3 at their inner or adjoining ends, each of said flanges being provided with a series of apertures 4 adjacent its periphery. Both of the hub sections are connected by a metal boxing 5. Arranged upon the inner or adjoining faces of the flanges are rings 6 and each ring has a plurality of apertures 7 designed to register with the openings 4 in the flanges so as to receive securing bolts which serve to bind the rings and flanges upon opposite edge portions of the spokes of the wheel. Each of these spokes consists of a bowed spring metal strip 9 tapered toward one end, the large end portion of said strip being folded as at 10 to form a wedge-like head 11. The terminal portion of this fold is bent inwardly as at 12 so as to bear against the bowed portion of the spoke 9 and thus constitute means for bracing the spoke adjacent its bent end. Shoulders 13 are formed upon opposite edge portions of the head 11 and are designed to extend into the rings 6, as indicated in Fig. 2, while the bolts 8 extend transversely through the heads and serve to bind the rings and the flanges thereagainst. The outer or small end of each spoke 9 is folded to form an arcuate loop 14 the end portions of which extend beyond opposite faces of the spoke. The terminal of the spoke bears against the bowed portion thereof as indicated at 15 and extends therealong for a desired distance so as to constitute a brace for the spoke. This terminal portion 15 is not secured to the bowed portion 9 but is capable of moving thereon and will not therefore interfere with the flexing of the spoke.

The felly 16 of the wheel is provided within its inner surface with a series of recesses 17 spaced apart at regular intervals and having their inner walls convex so as to conform with the contour of the outer or concave surface of each of the loops 14. Each of these recesses is of substantially the same length as one of the loops 14 and securing bolts 18 extend transversely through the end portions of each recess and are designed to also extend transversely through the end portions of the loop 14 as clearly indicated in Fig. 1. The bolts are supported within the recesses by means of side plates 19 which are bolted or otherwise fastened to the sides of the felly and are suitably apertured to receive the bolts 18. These plates 19 also extend beyond the periphery of the felly and constitute means for preventing lateral displacement of the tire 20 as indicated in Fig. 2.

In assembling the parts of the wheel the bolts 8 are inserted through the flange 3 and ring 6 of one of the hub sections, after which the spokes are placed with their heads 11 in contact as indicated in Fig. 1 and with the bolts extending through them. It will be seen that the heads are so shaped that when they are positioned in this manner they contact throughout their lengths. The other hub section with its ring 6 is then placed in engagement with the bolts 8 and by tightening the bolts the two flanges 3 will be bound or clamped against the opposite edge portions of the spoke heads 11 and the rings will be held in engagement with the shoulders 13.

These rings constitute means for preventing the spokes from pulling outward from the hub. It will be seen that when the parts are thus assembled the terminal portions 12 of the spokes completely close the spaces between the peripheral portions of the flanges so that dirt, etc., can not accumulate within the hub. The spokes are sprung into position within the recesses 17 and are then fastened by inserting bolts 18 transversely through the rings 19 and the end portions of the loops 14. After the parts have thus been assembled the wheel is in condition for use. Each of the spokes is thus free to flex at points between the hub and the felly and as those portions of the spokes which are engaged by the securing means are reinforced in the manner shown and described it will be apparent that all danger of the spokes snapping off at these points is practically eliminated. Importance is attached to the broad bearings between the spokes and the felly which reduce the friction to the minimum and as the spokes are void of any pivotal movement it will be apparent that the resiliency of the wheel is considerably increased. Importance is also attached to the fact that the inner ends of the spokes by reason of their peculiar disposition serve as combined spacing and bracing means and it is thus possible to dispense with fillers and similar devices such as heretofore utilized for the same purposes.

What is claimed is:

1. The combination with a hub and a felly, of bowed spokes secured to and connecting the hub and felly, and each having its inner end portion extending at an angle to the spoke and thence extended inwardly against the spoke to form a wedge-shaped loop constituting spacing and bracing means.

2. The combination with a hub and a felly, of spring spokes secured to the felly, each of said spokes having its inner end portion extending at an angle to the spoke and thence extended inwardly against the spoke to form a wedge-shaped loop constituting spacing and bracing means.

3. In a wheel the combination with a hub and spaced rings carried thereby, of spokes each having its inner end portion extended at an angle to the spoke and thence extended inwardly against the spoke to form a wedge-shaped loop constituting spacing and bracing means, said loops being clamped between the rings and having shoulders, the rings extending around and in contact with the shoulders to hold the loops in contact.

4. In a wheel the combination with spokes, the inner end of each spoke being extended at an angle to the spoke and thence extended inwardly against the spoke to form a wedge-shaped loop, said loops constituting combined spacing and bracing means, each of said loops having laterally extending shoulders, of retaining rings surrounding the shoulders, means for binding the rings upon the loops, said loops constituting closures for the spaces between the spokes and between the rings.

5. In a wheel the combination with a hub; of bowed resilient spokes outstanding therefrom, each spoke having a loop at its outer end extending beyond opposite faces of the spoke, a felly having recesses for the reception of the loops, side plates upon the felly, and means connecting said plates for securing the loops within the recesses.

6. The combination with a wheel having a recess therein; of a bowed spring spoke having a loop at one end thereof, said loop fitting snugly within the recess and having a concave outer face bearing against the wall of the recess, the terminal of the loop bearing loosely upon and constituting a brace for the bowed portion of the spoke, and means extending through opposite portions of the loop for securing said loop within the recess.

7. In a wheel a spoke comprising a bowed spring strip having a loop at one end thereof, said loop extending beyond opposite faces of the spoke and having its terminal portion parallel with and resting loosely upon the bowed portion of the spoke, said loop having a concave bearing surface.

8. In a wheel a spoke comprising a bowed spring strip folded at one end to constitute a wedge-like head, the terminal portion of said fold being inturned against the bowed portion of the spoke.

9. In a wheel a spoke comprising a bowed spring strip folded at one end to constitute a wedge-like head, the terminal portion of said fold being inturned against the bowed portion of the spoke, opposite faces of said fold having outstanding retaining ring engaging shoulders.

10. In a wheel a spoke comprising a bowed spring strip tapered toward one end, the large end of said spoke having an integral angular head provided with outstanding shoulders, the small end of said spoke having a loop extending beyond opposite faces thereof and having its terminal portion bearing loosely upon and constituting a brace for the bowed portion, the outer or bearing surface of said loop being concave.

In testimony that I claim the foregoing as my own, I have hereto affixed my signature in the presence of two witnesses.

EVERETT S. STANCLIFT.

Witnesses:
 DAVID CRAIG,
 E. O. SMITH.